March 15, 1966 B. LYMAN 3,240,488
DOCUMENT HANDLING APPARATUS HAVING A VACUUM
CONTROLLED PACK ADVANCER
Filed July 15, 1963 2 Sheets-Sheet 2

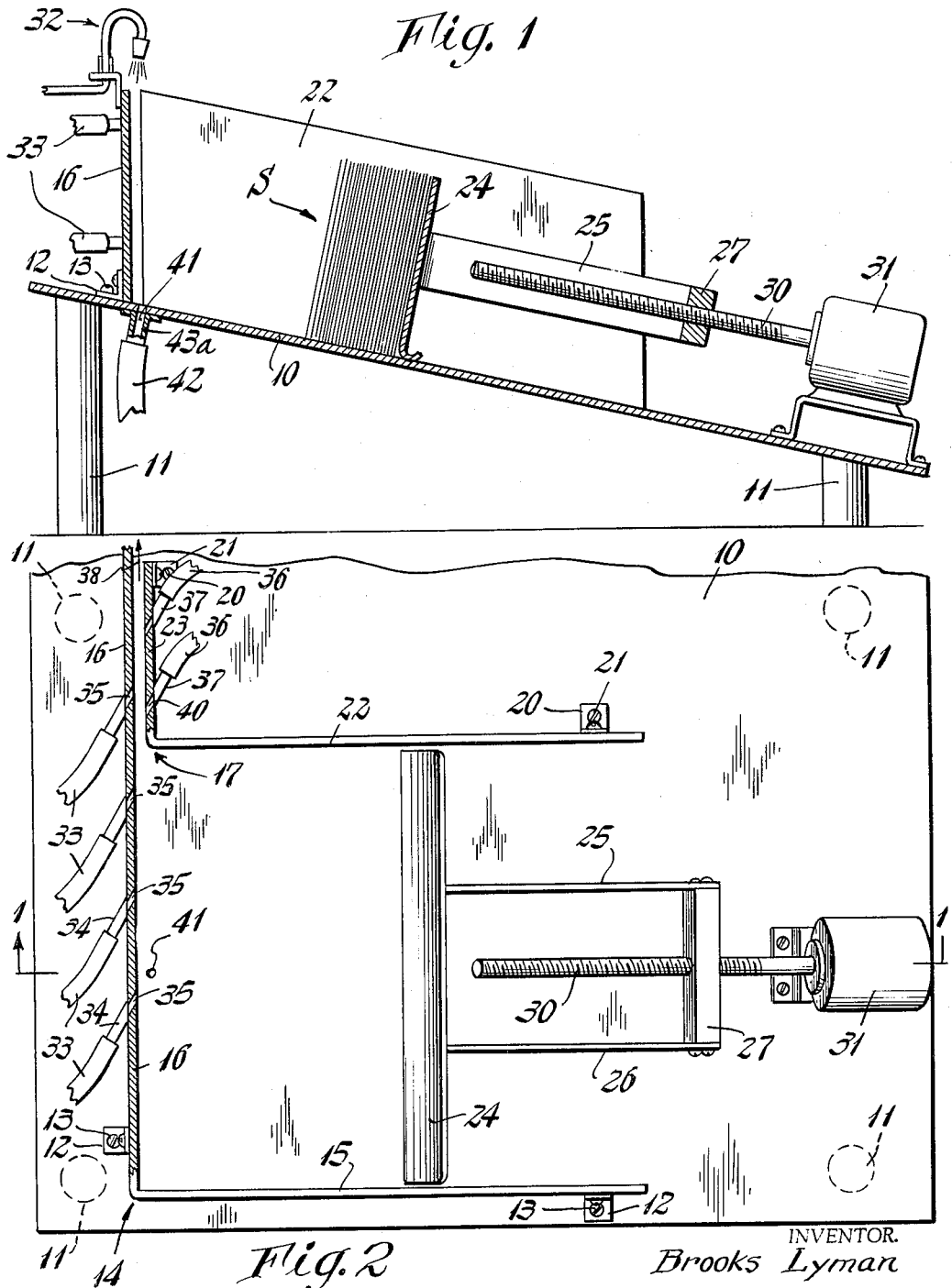

INVENTOR.
Brooks Lyman
BY
Albert W. Scribner
ATTORNEY

United States Patent Office 3,240,488
Patented Mar. 15, 1966

3,240,488
DOCUMENT HANDLING APPARATUS HAVING A
VACUUM CONTROLLED PACK ADVANCER
Brooks Lyman, Pound Ridge, N.Y., assignor to Pitney-Bowes, Inc., Stamford, Conn., a corporation of Delaware
Filed July 15, 1963, Ser. No. 295,079
1 Claim. (Cl. 271—62)

This invention relates to an improved system for controlling the advancing movement of a stack of documents. More particularly the invention relates to a novel means for sensing the physical density of a plurality of documents at a given location in a document stack and accordingly controlling a means for advancing additional documents toward said location.

In most document handling devices there are provided means for receiving and supporting a stack of documents that are to be processed and also means for successively removing individual documents from the stack and transporting the same serially along a predetermined feed path. As the documents are successively withdrawn from the stack at a separation plane and transported along said feed path a stack advancing means operates to advance the remaining stacked documents in a direction toward said separation plane so that at all times the next leading document in the stack is positioned at or near said separation plane preparatory to being transported away from said stack. When operating the stack advancing means applies a pack or advancing force to the stack and the application of this force tends to compress or squeeze the documents together; this squeezing action in turn making it more difficult to separate and extract a single document from the stack. The instant invention contemplates a system which controls and minimizes the interference between the pack forces and the document separating forces by affording a more accurate control over the effective mutual squeezing of the stacked documents located at or near the separation plane.

The primary object of the invention is to provide a novel document sensing device which is capable of sensing variations in the number or density of stacked documents in a predetermined area of a stack supporting means whereby the need to replenishing the supply of documents at said location may be continuously sensed.

Another object of the invention is to provide a novel stack advancing control method and apparatus for a document handling device whereby the edges of documents located adjacent a separation plane are continually sensed and whereby the document stack advancing means is accordingly rendered operative as required so that the document stack is progressively displaced toward said separation plane in a manner which will not adversely interfere with application of feeding forces to the leading document located at the separation plane.

Another object of the invention is to provide a document stack advancing means having an improved control means therefor whereby air is passed between documents stacked at a predetermined location and whereby the variation in document density or concentration at said location permits a corresponding variable quantity of air to flow between said documents; the sensed variable air flow conditions ultimately serving to control the operation of the stack advancing means.

A further object of the invention is to provide a novel pneumatic control method and apparatus whereby one or more of the documents in a document stack act as valving elements to restrict the amount of air permitted to flow through a control orifice so that pressure changes in the air stream caused by the document valving action may be used to servo-control other portions of the document handling system.

Other objects of the invention will become apparent as the disclosure progresses.

In the drawings:

FIG. 1 is a side elevational view in partial section and shows one structural embodiment of the instant invention.

FIG. 2 is a plan view in partial section of the apparatus shown in FIG. 1.

Figure 3:
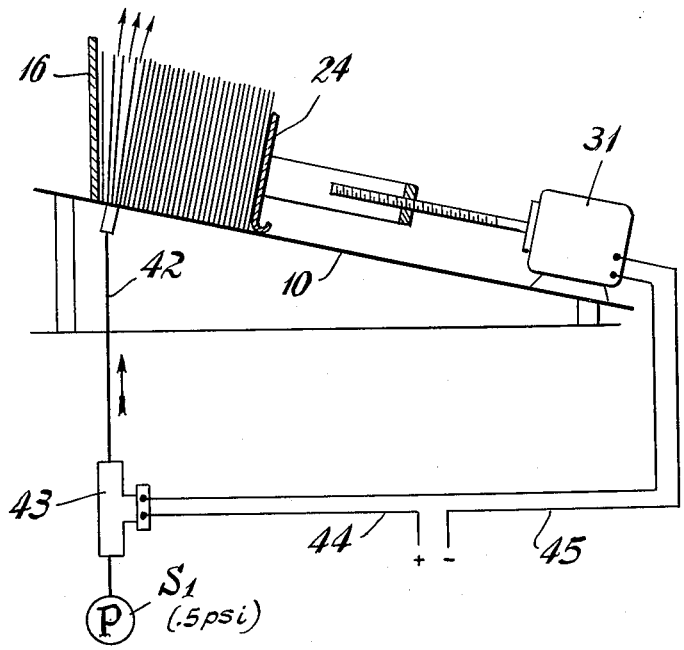
FIG. 3 is a diagrammatic view illustrating the pneumatic and electrical control connections for the apparatus of FIGS. 1 and 2.

The structural aspects of one embodiment of the invention are illustrated in FIGS. 1 and 2. Here there is provided an inclined document supporting base plate 10 that is provided with suitable legs 11. Fixedly mounted on the base plate 10 as by brackets 12 and screws 13 is a firist document guide member 14 having a transversely disposed guide portion 15 and an elongated longitudinal portion 16. A second document guide member 17 is fixedly mounted on the base plate 10 as by brackets 20 and screws 20 and 21. The guide member 17 is formed with a transversely diposed guide portion 22 and a short longitudinal portion 23 that is disposed close and parallel to the longitudinal portion 16 of guide member 14. Mounted for movement over the upper base plate surface between the parallel guide portions 15 and 22 is a document stack advancing plate 24. Fixed to the stack plate 24 are two rearwardly extending arms 25 and 26 having free outer ends that are rigidly interconnected by means of a block 27 that is appropirately threaded for cooperation with a lead screw 30 that is driven by a suitable electric motor 31. As will be apparent the stack advancing plate may be displaced toward or away from the guide portion 16 depending on the direction of rotation of the motor armature. A suitable document air riffling means 32, FIG. 1, may be secured to said portion 16 of guide member 14.

The area in front of plate 24 and between the guide portions 15 and 22 is adapted to receive a plurality of documents that are to be successively separated and individually transported along a feed path extending between the guide portions 16 and 23. The document stack is placed on edge on the base plate 10 with the plane of each document disposed substantially parallel with the front face of the stack advancing plate 24 as indicated at S of FIG. 1. Any suitable mechanical, pneumatic, aerodynamic or other means may be used to separate and transport the individual documents away from the document stack. For the purposes of illustration an aerodynamic feeding means is shown here, such means including a plurality of air pressure lines 33 that are respectively pneumatically coupled by means of suitable fittings 34 to a plurality of spaced angularly oriented air jet aperatures 35 that are formed through the wall of the guide portion 16; the lines 33 communicating with a suitable air pressure source. A pair of similar air pressure lines 36 that also communicate with a suitable air pressure source are respectively pneumatically coupled by means of suitable fittings 37 to a pair of angularly oriented reverse air jet apertures 40 formed through the wall of the guide portion 23. In operation the intermittent jets of air issuing from apertures 35 are respectively adapted to aerodynamically separate the successive leading documents from the stack and propel the same along a feed path disposed close to and substantially parallel with the adjacent surface of the guide portion 16, as indicated by arrow 38, FIG. 2. The continuously operating reverse air jets issuing from the holes 40 serve to prevent a feeding movement of a second document along said feed path simultaneously with the feeding movement of any leading document therealong.

As will be apparent the document stack must be gradually advanced toward the guide portion 16 by the motor driven plate 24 as the stack is depleted by the extraction of the successive leading documents thereof. Certain difficulties have been encountered here in correlating the stack advancing movement and the stack deleting withdrawal of the individual leading documents. Several proposals have been made to mechanically sense the pack force, i.e. the pack compression forces existing between documents at the separation plane, and to accordingly control the stack advance: however, where pack forces are large the document pinching action thereof will tend to interfere with the proper withdrawal of each separate document from the stack. The instant invention contemplates an arrangement whereby the need for advancing the document stack may be determined and regulated in such a way as to not interfere with the efficient withdrawal of individual lead documents from the stack.

In the base plate 10 there is formed a control air port 41, FIG. 2, that communicates with an air line 42, FIG. 1, through a suitable fitting 43. Air is adapted to flow through port 41 and between those documents whose lower edges are disposed over and adjacent to the air port 41. The document edges covering the air port 41 will inhibit the air flow through port 41 to an extent dependent upon the compactness or density of these stacked documents. Here then the variations in air flow through port 41 and thus in the line 42 will be a measure of the need for a stack advancing movement. Sensing and control means are provided to sense variations in the air flow characteristic in line 42 so as to thereby make it possible to control the operation of the stack advancing motor 31. Two embodiments of such servo-type control apparatus are respectively illustrated in FIGS. 3 and 4.

Considering first the embodiment illustrated in FIG. 3 the air control line 42 is connected to an air pressure source S1 through any suitable settable pressure sensitive electrical switch 43. In that such pressure sensitive switches are well known and commercially available no detailed description thereof need be made here. The contacts of the switch 43 are serially connected in one of the two electrical lead lines 44, 45 of motor 31. Switch 43 is normally closed and is set to open when there is greater than a predetermined pressure in line 42. This predetermined pressure will be created in line 42 when the number or density of document edges covering air port 41 reaches a particular level. When said predetermined pressure is exceeded the switch 43 opens and motor 31 stops whereupon continued successive separation and withdrawal of leading documents from the stack by the transport means will gradually delete the number of documents covering port 41 whereby the air flow through port 41 will increase and pressure in line 42 will gradually decrease to a value below said predetermined level whereupon the switch 43 will again close thereby causing the motor to advance the stack to an extent sufficient to cause the increase in pressure in line 42 to again open switch 43. In this type of operation the documents themselves in covering port 41 collectively act as a valve so as to variably meter the air flow through port 41 and the line 42. Stated another way the instant sensing technique detects the physical density of documents by effectively measuring the air flow rate between documents and when the air flow rate is above or below a desired range the said density or compactness of the stacked documents is accordingly increased or decreased respectively. This servo-control of the stack advancing means has been found to be particularly effective in keeping the leading document of the stack positionally accessible and available for efficient separation but without interfering with the other transporting operations. Although air being exhausted through port 41 flows upwardly between the adjacent documents there will be no significant tendency for the documents to be improperly elevated or lifted in that the air supply pressures used here are very low, for example less than 1 p.s.i.; the air flow produced thereby not being sufficient to sustain the weight of one or more of said documents.

Figure 4:
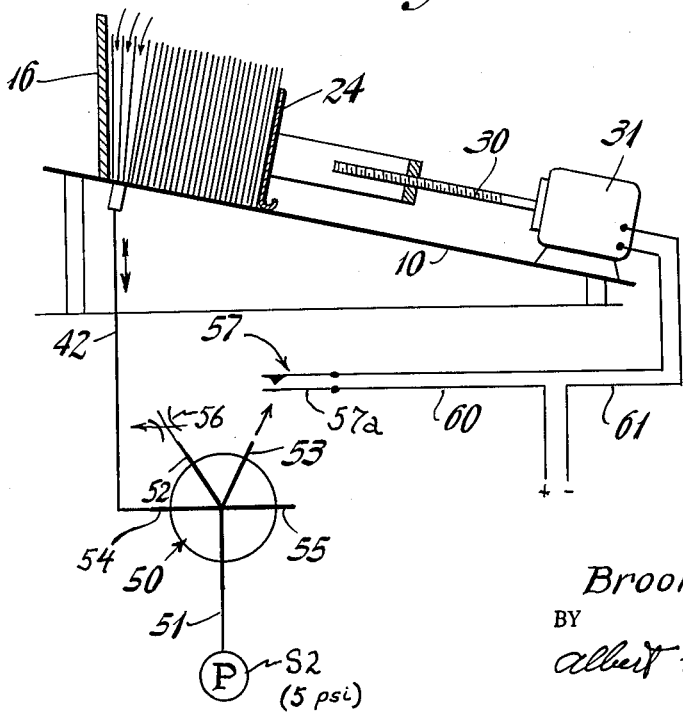
FIG. 4 is a diagrammatic view illustrating an alternate control system for the apparatus of FIGS. 1 and 2.

The alternate servo-type control apparatus shown in FIG. 4 comprises a conventional type bi-stable fluid amplifier 50 having an input line 51, two output lines 52 and 53, and two control lines 54 and 55. In that this type of fluid amplifier is now well known and commercially available no detailed explanation thereof need be made here. The amplifier input line 51 is connected to an air supply S2, the output line 52 is connected to a conventional type variably restricted outlet orifice or valve 56, while the control line 54 is connected to the line 42. Disposed adjacent the end of output line 53 is an operating arm 57a of a normally open electrical switch 57 having contacts that are serially connected in one of the two electrical lead lines 60 and 61 of motor 31. The switch 57 is adapted to be closed and remain closed for as long as air from the amplifier output line 53 impinges on the lower surface of said contact arm 57a of the switch.

In operation the control line 55 is left open and the adjustable valve 56 is set so that the amplifier 50 normally conducts air through the output line 53, the resulting asperating effect in control line 54 serving to induce an air flow 62 between the documents adjacent said air port 41 and through line 42 into the main air stream of the fluid amplifier. These normal flow conditions serve to permit the switch 57 to remain closed so that motor 31 may advance the stack of documents toward the guide portion 16. When the number or concentration of document edges covering the port 41 reaches a level so as to critically impede the flow of air 62 the pressure in line 42 and the amplifier control line 54 will drop to a level which will cause the amplifier 50 to shift to its other operational mode whereby air flows through the output line 52. When this occurs the switch 57 will be opened and motor 31 will cease to advance the document stack. Thereafter as the document transport means continues to successively remove documents from the stack the decrease in density of the documents located over the port 41 will eventually permit sufficient air to flow through lines 42 and 54 so that the amplifier 50 shifts back to its normal mode of operation wherein switch 57 is closed and the motor 31 again advances the stack to an extent determined by the maximum permissible concentration of document edges over the control port 41. The digital type control arrangement of FIG. 4 has been found particularly advantageous where an aerodynamic separating and feeding means is used as illustrated in FIGS. 1 and 2.

In each control arrangement of FIGS. 3 and 4 respectively, suitable manual or automatic motor reversing switches may be provided in order to withdraw the stack advancing plate 24 to a loading position after the separating and transporting of any given stack of documents has been completed and preperatory for subsequent stack advancing operations.

Since many changes could be made in the embodiment of the invention as particularly described and shown herein without departing from the scope of the invention, it is intended that this embodiment be considered as exemplary and that the invention not be limited except as warranted by the following claim.

What is claimed is:

In a document handling device:
a support plate for receiving and supporting a stack of documents, said plate having an inclined upper surface that is adapted to engage and support the lower edges of the documents in the document stack;
document retaining means for laterally supporting the documents in said stack;

drive means engaging the rearward end face of said document stack for advancing said stack in an uphill direction along the inclined surface of said supporting plate and towards a document separation plane;

means disposed along the said inclined surface of said suport plate for defining a sensing orifice, said orifice being positioned and arranged so that it may be covered by the lower edges of some of the leading documents in said stack as said stack is progressively advanced upwardly along said inclined plate surface and towards said separation plane;

vacuum generating means pneumatically coupled to said sensing orifice for creating a subatmospheric pressure in said orifice so as to thereby induce an air flow into said orifice from the surrounding atmospheric region, said air flow occurring between the faces of those mutually adjacent documents whose lower edges then overlie said orifice, the documents whose lower edges overlie said orifice thereby being pneumatically biased toward said plate surface and collectively acting as a valve for controlling the flow of air from said surrounding atmospheric region into said orifice and also for controlling the subatmospheric pressure level in said orifice, variations in the density of the valving documents causing corresponding variations in the amount of air permitted to flow into said orifice and also in the subatmospheric pressure level in said orifice; and control means operated in response to a predetermined subatmospheric air presure level in said orifice for controlling the operation of said drive means whereby said document stack may be incrementally advanced upwardly along said inclined plate surface in accordance with the sensed density of said leading documents of said stack, and whereby the normal squeezing force between the said valving documents is independent of any component of the weight of that remaining portion of the document stack that is farther away from the said separation plane than said valving documents.

References Cited by the Examiner
UNITED STATES PATENTS

| | | | |
|---|---|---|---|
| 2,572,509 | 10/1951 | Novick | 271—62 |
| 2,733,920 | 2/1956 | Von Hofe et al. | 271—31 |
| 2,792,218 | 5/1957 | Van Morle | 271—68 X |
| 2,994,253 | 8/1961 | Jones | 271—31 X |
| 2,994,528 | 8/1961 | Hull | 271—56 |
| 3,024,805 | 3/1962 | Horton | 137—597 |
| 3,080,886 | 3/1963 | Severson | 137—597 |
| 3,086,771 | 4/1963 | Goin et al. | 271—31 |
| 3,123,355 | 3/1964 | Lessig | 271—62 |
| 3,136,539 | 6/1964 | Lyman | 271—60 X |

M. HENSON WOOD, Jr., *Primary Examiner.*

ERNEST A. FALLER, ROBERT B. REEVES, *Examiners*